United States Patent

Lou et al.

(10) Patent No.: US 9,674,250 B2
(45) Date of Patent: Jun. 6, 2017

(54) MEDIA ASSET MANAGEMENT SYSTEM

(75) Inventors: Zhe Lou, Mortsel (BE); Jan Moons, Heist-op-den-Berg (BE)

(73) Assignee: Alcatel Lucent, Boulogne-Billancourt (FR)

( * ) Notice: Subject to any disclaimer, the term of this patent is extended or adjusted under 35 U.S.C. 154(b) by 254 days.

(21) Appl. No.: 13/995,621

(22) PCT Filed: Dec. 14, 2011

(86) PCT No.: PCT/EP2011/072765
§ 371 (c)(1),
(2), (4) Date: Jun. 19, 2013

(87) PCT Pub. No.: WO2012/084641
PCT Pub. Date: Jun. 28, 2012

(65) Prior Publication Data
US 2013/0282829 A1    Oct. 24, 2013

(30) Foreign Application Priority Data

Dec. 20, 2010   (EP) .................................. 10306459

(51) Int. Cl.
*H04L 29/06* (2006.01)
*G06Q 10/10* (2012.01)
(Continued)

(52) U.S. Cl.
CPC ........... *H04L 65/60* (2013.01); *G06Q 10/101* (2013.01); *G06Q 30/02* (2013.01);
(Continued)

(58) Field of Classification Search
CPC ............... H04L 65/60; H04N 21/2743; H04N 21/4223; H04N 21/44008;
(Continued)

(56) References Cited

U.S. PATENT DOCUMENTS 8,566,722 B2 * 10/2013 Gordon et al. ................ 715/721
2003/0118974 A1 * 6/2003 Obrador .................. G09B 23/28
434/236

(Continued)

FOREIGN PATENT DOCUMENTS

| CN | 1942970 A | 4/2007 |
| CN | 101086741 A | 12/2007 |
| JP | 2005-352601 A | 12/2005 |
| JP | 2007-328675 A | 12/2007 |

OTHER PUBLICATIONS

International Search Report for PCT/EP2011/072765 dated Feb. 6, 2012.

*Primary Examiner* — Michael C Lai
(74) *Attorney, Agent, or Firm* — Fay Sharpe, LLP

(57) ABSTRACT

The present invention relates to a Media Asset management System for managing at least one media asset maintained by a media asset repository. This system comprises a media asset repository for maintaining at least one media asset and further a user terminal that is adapted to access the media asset repository where the repository is coupled to the user terminal over a communications link. The media asset management system further comprises a media asset feedback detection Part that is adapted to detect feedback of a user at said user terminal on the media asset at managing the media asset by the user terminal and a feedback interpreting part that is adapted to determine an annotation to the media asset managed based on an interpretation/analysis of the feedback on the media asset.

12 Claims, 1 Drawing Sheet

(51) Int. Cl.
  *G06Q 30/02* (2012.01)
  *H04N 21/2743* (2011.01)
  *H04N 21/4223* (2011.01)
  *H04N 21/44* (2011.01)
  *H04N 21/442* (2011.01)
  *H04N 21/475* (2011.01)
  *H04N 21/658* (2011.01)
  *H04N 21/84* (2011.01)

(52) U.S. Cl.
  CPC ..... *H04N 21/2743* (2013.01); *H04N 21/4223* (2013.01); *H04N 21/44008* (2013.01); *H04N 21/44218* (2013.01); *H04N 21/4756* (2013.01); *H04N 21/6582* (2013.01); *H04N 21/84* (2013.01)

(58) Field of Classification Search
  CPC ......... H04N 21/44218; H04N 21/4756; H04N 21/6582; H04N 21/84; G06Q 10/101; G06Q 30/02
  See application file for complete search history.

(56) References Cited

U.S. PATENT DOCUMENTS

| | | | |
|---|---|---|---|
| 2007/0223871 A1* | 9/2007 | Thelen | G11B 27/105 386/280 |
| 2008/0010060 A1* | 1/2008 | Asano | G06F 17/30032 704/10 |
| 2008/0170123 A1* | 7/2008 | Albertson | A63B 24/0003 348/157 |
| 2008/0275830 A1* | 11/2008 | Greig | G06K 9/00315 706/21 |
| 2010/0049590 A1* | 2/2010 | Anshul | G06F 17/2785 705/7.32 |
| 2011/0178981 A1* | 7/2011 | Bowen | G06Q 10/00 707/608 |
| 2011/0221684 A1* | 9/2011 | Rydenhag | G06F 3/041 345/173 |
| 2012/0139844 A1* | 6/2012 | Ramstein | G06F 3/016 345/173 |
| 2012/0192056 A1* | 7/2012 | Migos | G06F 3/04883 715/230 |
| 2012/0278725 A1* | 11/2012 | Gordon | H04N 21/2665 715/738 |
| 2012/0323087 A1* | 12/2012 | Leon Villeda | A61B 5/165 600/301 |

* cited by examiner

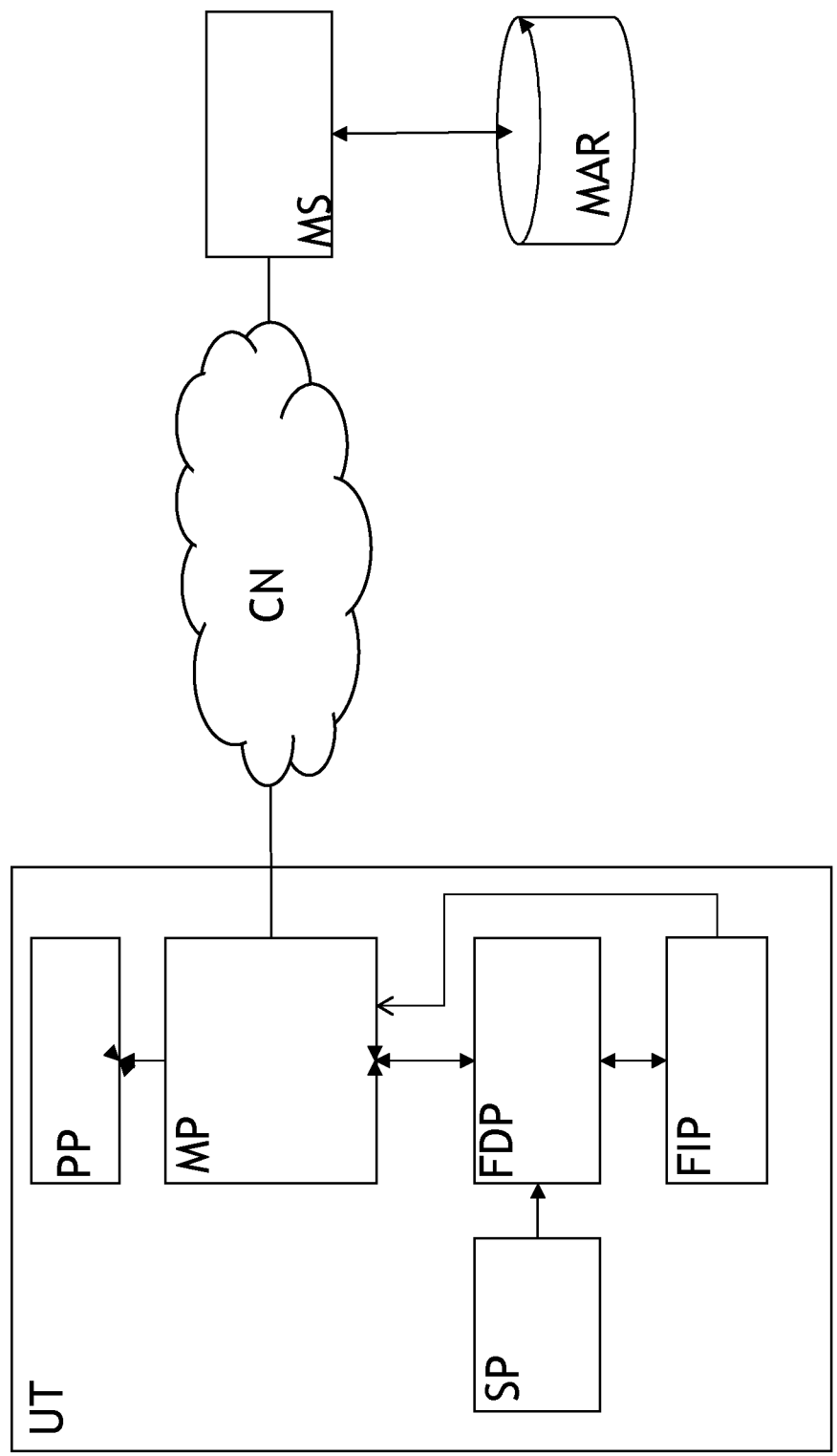

MEDIA ASSET MANAGEMENT SYSTEM

The present invention relates to a Media asset management system according to the preamble of claim 1, a Media asset management method according to the preamble of claim 4, a related user terminal according to the preamble of claim 5.

Such a Media asset management system is well known in the art. In such management system, people are able to access, e.g. retrieve available media assets or store or upload new media assets. In such a system it is also possible to attach metadata to a media asset either being (pictures, video assets, audio etc.) to provide more contextual information to a media asset presently available in such system or when stored in the system. For instance, when uploading a picture to Flickr website, we are asked to provide additional metadata. However, not everyone is willing to spend time to annotate extra information to a picture or a video. And it is even more difficult to ask people to update those extra information regularly. When we watch or review some pictures or videos, e.g. from YouTube, we are not always with the intention to write our comments, although comments may be appreciated by media creators or owners.

An objective of the present invention is to provide a media asset management system of the above known type but wherein the media asset management system is improved in that annotation of media assets is facilitated and requiring less effort.

According to the invention, this objective is achieved by the system described in claim 1, the Media asset management method as described in claim 4, the related user terminal described in claim 5, and the related network element as described in claim 8.

Indeed, by applying a media asset feedback detection part that is adapted to detect feedback of a user on a media asset at managing the media asset, i.e. opening the asset storing the asset, modifying the media asset etc., by the user terminal and subsequently determine an annotation to the managed media asset based on an interpretation/analysis of the feedback on the media asset.

Managing a media asset includes the accessing-, retrieving-, modifying a media asset respectively at/from a media asset repository or storing or uploading a media asset at the media asset repository.

The media asset feedback detection part FDP analyzes a media asset being managed, e.g. being accessed or stored, such as a video and detects and possibly also captures the user's behavior and facial expression via a webcam and sound the user produces. This user's behavior and facial expression may include or express emotions of the viewer e.g. happiness, angriness, etc.), body language of the user, e.g. nodding->agreeing, etc.) And speech comments ("This is cool!") physical body-characteristics like blood pressure skin resistance etc.

Subsequently the detected viewer's emotions, body languages and speech activities are interpreted and translated into comments and remarks based on pre-defined or customized rules. For the interpretation and translation, a relational database, as well as more advance ontology database, to store those rules can be applied. The annotation being the generated comments and or remarks can be applied for the factual annotation of the subject media asset.

Another characterizing embodiment of the present invention is described in claim 2.

Furthermore the system includes a media asset annotating part that is able to annotate the media asset accessed based on the feedback of the user accessing the media asset. The annotating is adding the determined annotation to the accessed media asset which may be performed by forwarding the determined annotation directly to a media asset repository or alternatively indirectly towards the media asset repository but via a media asset server for storing at least the determined annotation together with the accessed media asset in a media asset repository where the determined annotation includes the determined into comments and remarks.

Another characterizing embodiment of the present invention is described in claim 3.

The media asset feedback detection Part is adapted to detect the feedback of a user at said user terminal by means of a sensor.

Such sensor may be camera recording or detecting the feedback of a viewer like emotion, gesture, etc., a microphone at the user terminal for recording or detecting voice feedback or other audio feedback like applauding or others, sensors for determining body characteristics like blood pressure, skin resistance, heart beat, or sensors for determining the environmental context like temperature, light condition, etc.

Further characterizing embodiments of the present Media asset management system are mentioned in the appended embodiment.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein:

FIG. 1 represents the media asset management system in accordance with the present invention including a user terminal being a communications device and a media asset repository MAR and a media server MS for controlling the media asset repository MAR.

In the following paragraphs, referring to the drawing in FIG. 1 an implementation of the system is described. In the second paragraph, all connections between mentioned elements are defined.

Subsequently all relevant functional means of the mentioned system as presented in FIG. 1 are described followed by a description of all interconnections. In the succeeding paragraph the actual execution of the communication system is described.

A first essential element of the Media Asset management System for managing at least one media asset maintained by a media asset repository, is a media asset repository MAR for maintaining at least one media asset. This media asset repository MAR is under control of a media server MS. Such a media asset repository MAR may be a media asset database located in the cloud being implemented as a central database or a plurality of distributed database elements.

Alternatively such database may be a local database being implemented in the user terminal UT or coupled over a short distance communications link.

Further there is a user terminal UT that is adapted to manage, that is access, the media asset repository via the media server. Such a user terminal UT may be a personal computer a mobile communications device both having internet connectivity for having access to a media asset repository or any other communications device able to retrieve and present media assets to a user or storing media assets in the media asset repository MAR.

The media asset repository MAR is coupled to the media server MS that in turn is coupled to the user terminal UT over a communications link supported by a communications network like an Internet protocol network an access network a combination thereof or any other fixed or mobile communications network CN.

The User terminal UT first comprises a media asset managing part MP that is adapted to manage at least one media asset maintained in the media asset repository MAR where managing for instance may include retrieving of a media asset from the repository or storing a new media asset in the media asset repository MAR. Further there is a presenting part PP that is able to present a media asset to the user of the user terminal UT where the presenting part may be a display of the user terminal with speakers or be an external display with or without speakers for playing potential audio and video parts of an asset.

The User terminal UT further comprises a media asset feedback detection Part FDP that is adapted to detect feedback of a user at the user terminal UT on the media asset at accessing such a media asset or at watching and/or listening to such media asset before storing such asset in the media asset repository MAR by the user terminal UT and a feedback interpreting part FIP that is adapted to determine an annotation to the managed media asset based on an interpretation/analysis of the user's feedback on this media asset.

The managing part of the user terminal UT additionally further is adapted to annotate the media asset managed based on the user's feedback.

The media asset feedback detection Part FDP is adapted to detect the feedback of a user at the user terminal UT, and possibly his environment, by means of a sensor like where such sensor may be a camera recording or detecting the feedback of a viewer, a microphone at the user terminal for recording or detecting voice feedback or other audio feedback like applauding or others, sensors for determining body characteristics like blood pressure, skin resistance heart beat, or sensors for determining the environmental context like temperature, light condition, etc.

The media asset managing part MP has an input/output-terminal that is at the same time an input/output-terminal of the user terminal UT. The media asset managing part MP further is coupled to the media asset presenting part PP and in addition is coupled to the media asset feedback detection Part FDP. The media asset feedback detection Part FDP, further, is coupled with an output to an input of the feedback interpreting part FIP that in turn is coupled with an output to an input of the media asset managing part MP.

The media asset feedback detection Part FDP further is coupled with an input to an output of the sensor SP.

The media asset repository MAR is coupled to a media server MS that in turn is coupled to the communications link being supported, in this embodiment, by an access network and a coupled Internet protocol network where this aggregation of possible coupling networks is presented as communications network CN.

In order to explain the present invention it is assumed that a user is browsing media assets like some video asset which are stored in a repository of e.g. YouTube and which is accessible via the internet using a web browser running at the personal computer UT of the user, where the web-browser may implement at least part of the media asset managing part MP and the presenting part PP. The user watches the meant video and as he likes the video and considers it very funny, he is laughing loud. The sensor SP here being a webcam mounted on the user terminal UT being the personal computer and a microphone built-in in the personal computer UT records all expressions, i.e. the body language, gestures of the user and records the sounds the user is producing being the loud laughing and maybe some yelling as well.

The media asset feedback detection Part FDP, detects this feedback of the user at the personal computer UT of this user on the YouTube video playing at the personal computer UT. All this feedback being the body language, the gestures of the user and the loud laughing with or without any yelling is interpreted by the feedback interpreting part FIP that based hereon determines the annotation of the YouTube video being e.g. the text "I like this" or even the voice annotation of the user saying "I like this".

The interpretation could be implemented by rule based reasoning. Rule engines like Jena, Protégé, Drools can be adopted to realize the feedback interpreting. For instance, when the FDP detects the smiling of the user, it will be translated into "I like it", which will be annotated to the media. When the FDP detects that the user is smiling and generates loud audio signal and is dancing, it will be interpreted as "It is fantastic! Really cool! I love it!". Users are allowed to customize their personal rules.

The Feedback interpreting part is responsible to translate the detected viewer's emotions, body languages and speech activities into comments and remarks based on pre-defined or customized rules. A relational database, as well as more advance ontology database, can be applied to store those rules. The generated comments/remarks will be annotated back to the viewing media.

Subsequently, as the annotation is determined, this annotation is sent to the media server accompanied with a request to store the determined annotation with the YouTube video so that a next user accessing the same video in addition obtains the added annotation or may have access to the annotation as well.

An alternative embodiment of the present invention could include a local repository being included in the user terminal or be coupled to the user terminal over a short distance communications link like USB, Bluetooth, WiFi, NFC and any other equivalent short distance communication means.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A media asset management system for managing at least one media asset, comprising:
   a media asset repository for maintaining said at least one media asset, said media access repository controlled by a media server;
   a user terminal configured to access said media asset repository, said user terminal including a presenting part;
   said repository being coupled to said user terminal over a communications link;
   a media asset feedback detection part configured to detect an audible behavior of a user at said user terminal related to said at least one media asset at managing said at least one media asset by said user terminal; and
   a feedback interpreting part configured to determine an annotation to said at least one media asset managed based on an interpretation/analysis of said audible behavior of said user related to said at least one media asset; and
   wherein the annotation indicates that the user likes said at least one media asset; and
   wherein the feedback interpreting part is further configured to:
   determine the annotation that indicates that the user likes said at least one media asset based on a rules based reasoning; and
   allow users to customize their personal rules.

2. The media asset management system according to claim 1, wherein said media asset management system further comprises:
   a media asset annotating part configured to annotate said at least one media asset managed based on said audible behavior of said user related to said at least one media asset.

3. The media asset management system according to claim 1, wherein said media asset feedback detection part is configured to detect said audible behavior of a user at said user terminal by means of a sensor.

4. The media asset management system according to claim 1, wherein the annotation is based on blood pressure.

5. The media asset management system according to claim 1, wherein the annotation is based on skin resistance.

6. A method for media asset management of at least one media asset, comprising:
   maintaining, with a media asset repository, said at least one media asset;
   with a user terminal, managing said media asset repository through a media server, said repository being coupled to said user terminal over a communications link, and said user terminal including a presenting part;
   detecting, with a media asset feedback detection part, an audible behavior of a user at said user terminal related to said at least one media asset at managing said at least one media asset by said user terminal; and
   determining, with a feedback interpreting part, an annotation to said at least one media asset managed based on an interpretation/analysis of said audible behavior of said user related to said at least one media asset; and
   wherein the annotation indicates that the user likes said at least one media asset; and
   wherein the determining further comprises:
   determining the annotation that indicates that the user likes said at least one media asset based on a rules based reasoning; and
   allowing users to customize their personal rules.

7. A user terminal for managing at least one media asset maintained by a media asset repository, comprising:
   a presenting part configured to present information;
   said user terminal being configured to manage said media asset repository through a media server, said repository being coupled to said user terminal over a communications link;
   a media asset feedback detection part configured to detect an audible behavior of a user at said user terminal related to said at least one media asset at managing said at least one media asset by said user terminal; and
   a feedback interpreting part configured to determine an annotation to said at least one media asset based on an interpretation/analysis of said audible behavior of said user related to said at least one media asset; and
   wherein the annotation indicates that the user likes said at least one media asset; and
   wherein the feedback interpreting part is further configured to:
   determine the annotation that indicates that the user likes said at least one media asset based on a rules based reasoning; and
   allow users to customize their personal rules.

8. The user terminal according to claim 7, wherein said user terminal further comprises:
   a media asset managing part configured to annotate said at least one media asset managed based on said audible behavior of said user related to said at least one media asset.

9. The user terminal according to claim 7, wherein said media asset feedback detection part is configured to detect said audible behavior of a user at said user terminal by means of a sensor.

10. A network element for use in a communications system including a media asset repository for maintaining at least one media asset, said media access repository controlled by a media server, a user terminal configured to access said media asset repository, said user terminal including a presenting part, said repository being coupled to said user terminal over a communications link,
    said network element comprises:
    a media asset feedback detection part configured to detect an audible behavior of a user at said user terminal related to said at least one media asset at managing said at least one media asset by said user terminal; and
    a feedback interpreting part configured to determine an annotation to said at least one media asset based on an interpretation/analysis of said audible behavior of a user related to said at least one media asset; and
    wherein the annotation indicates that the user likes said at least one media asset; and
    wherein the feedback interpreting part is further configured to:
    determine the annotation that indicates that the user likes said at east one media asset based on a rules based reasoning; and
    allow users to customize their personal rules.

11. A media server including a processor configured to execute instructions stored on a non-transitory computer medium, the instructions executable to:
    control a media asset repository that maintains at least one media asset;
    communicate with a user terminal including a presenting part;

receive an annotation from the user terminal, the annotation based on an interpretation/analysis of an audible, detected behavior of a user related to said at least one media asset; and wherein the annotation indicates that the user likes said at least one media asset; and wherein the instructions are further executable to:

determine the annotation that indicates that the user likes said at least one media asset based on a rules based reasoning; and allow users to customize their personal rules.

12. A media asset repository including a processor configured to execute instructions stored on a non-transitory computer medium, the instructions executable to:

receive controlling instructions from a media server;

communicate with a user terminal including a presenting part;

maintain at least one media asset;

receive an annotation from the user terminal, the annotation based on an interpretation/analysis of an audible, detected behavior of a user related to said at least one media asset; and wherein the annotation indicates that the user likes said at least one media asset; and wherein the instructions are further executable to:

determine the annotation that indicates that the user likes said at least one media asset based on a rules based reasoning; and allow users to customize their personal rules.

\* \* \* \* \*